United States Patent

[11] 3,621,128

[72] Inventor Carl R. Driskell
       Winter Park, Fla.
[21] Appl. No. 24,750
[22] Filed Apr. 1, 1970
[45] Patented Nov. 16, 1971
[73] Assignee The United States of America as
       represented by the Secretary of the Navy

[54] PERISCOPE STADIMETER SIMULATOR WITH VIDEO DELAY
     8 Claims, 2 Drawing Figs.

[52] U.S. Cl. .................................................. 178/6.8,
                                        178/DIG. 23, 178/DIG. 35
[51] Int. Cl. ................................................ H04n 5/22,
                                                              H04n 7/18
[50] Field of Search ......................................... 178/6.8,
                                                   DIG. 23, DIG. 35

[56] References Cited
UNITED STATES PATENTS
2,165,028   7/1939   Blumlein ..................... 178/7.5

Primary Examiner—Robert L. Griffin
Assistant Examiner—Richard K. Eckert, Jr.
Attorneys—Richard S. Sciascia, John W. Pease and John F. Miller ABSTRACT: Apparatus for use in an electronic periscope view simulator training device for electronically simulating periscope stadimeter operation.

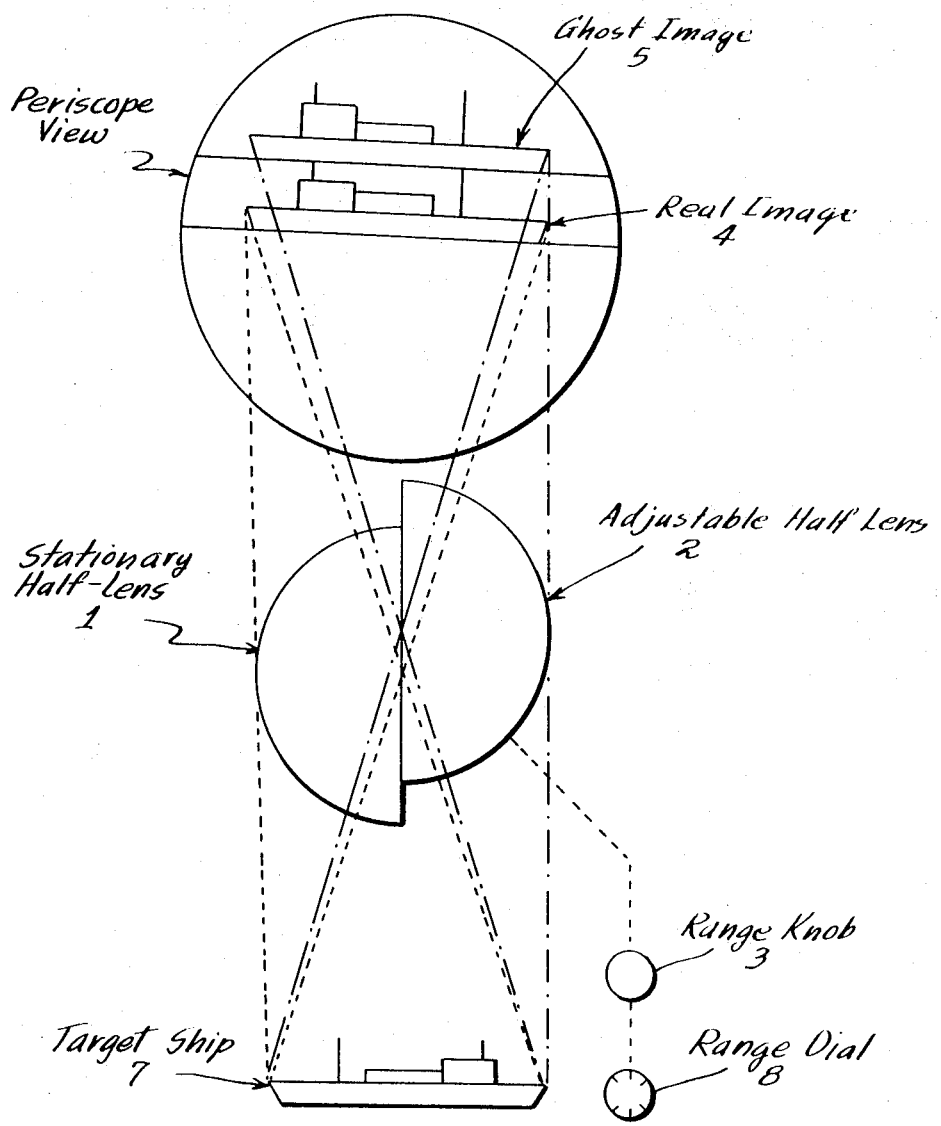

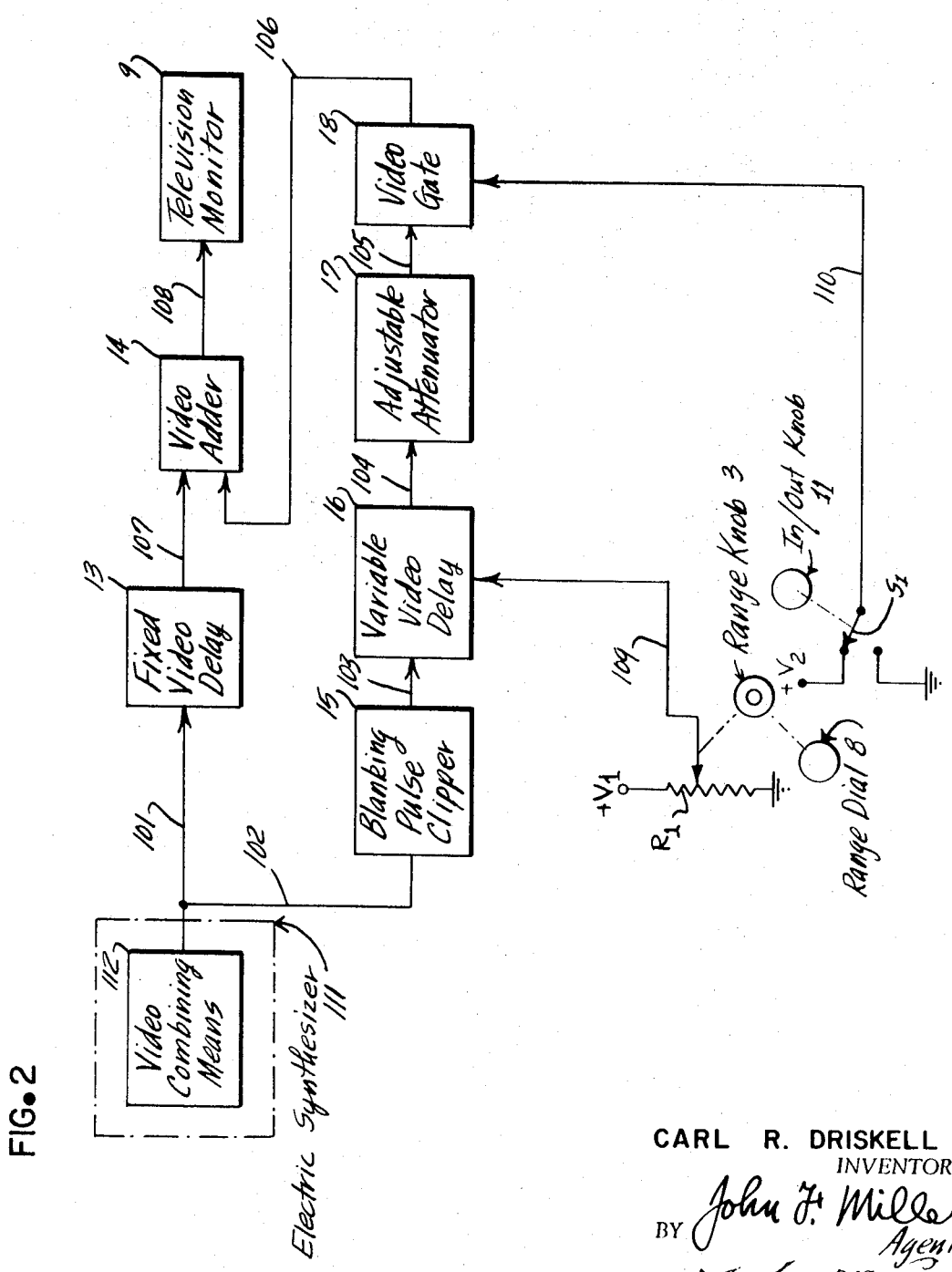

PERISCOPE STADIMETER SIMULATOR WITH VIDEO DELAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention is in the field of training devices. As mechanisms such as airplanes, ships, submarines, etc., become increasingly complex and expensive, the role of training devices which simulate the environment and operation of the actual mechanisms become increasingly important. Pilots, radar specialists, sonar specialists, and other operating personnel can acquire and enhance their various skills by using such training devices without risking the dangers to personnel and apparatus entailed in training in the actual mechanisms. Particularly, when the mechanism may cost millions and cost thousands per hour to operate. One important training device is a periscope view simulator which simulates a periscope installation in a submarine. A submarine typically costs in the millions and in the thousands for hourly operating expenses. The periscope view simulator enables submarine crews to become proficient in the complex art of periscope operation at costs which are relatively trivial and at no risk to life or property. A periscope installed in a submarine usually includes an optical stadimeter for determining the range of distant objects. This invention enhances the effectiveness of a periscope view simulator by adding stadimeter controls and simulating the operation of a stadimeter. This enables a trainee to become skilled in very phase of periscope operation before he operates the periscope of a real submarine.

BRIEF DESCRIPTION OF THE DRAWINGS

FIG. 1 illustrates the operation of an optical stadimeter such as is commonly found on submarine periscopes.

FIG. 2 is a block diagram of the invention.

DESCRIPTION OF THE PREFERRED EMBODIMENT

The stadimeter on an operational periscope such as is installed on a submarine utilizes a split lens arrangement comprising two half-lens to create a double image at the periscope eyepiece, as illustrated in FIG. 1. Two images are formed since each half-lens forms a complete image. A half-lens 1 is held stationary while a half-lens 2 is mechanically linked to and positioned by an operator's range knob 3. A "ghost" image 5 of a ship 7 or other object is shifted upward by half-lens 2. A "real" image 4 remains stationary since half-lens 1 does not move.

For a target range reading, the ghost image 5 is positioned by moving the range knob to a setting such that the waterline of the ghost image is aligned with the upper extremity of the real image, as illustrated in the periscope view of FIG. 1. The range of a target of known height may be read directly from a range dial 8 which is mechanically linked to range knob 3. When the stadimeter is not in use, the two lens halves 1 and 2 may be shifted out of the optical path and replaced by a single lens for a single target image.

In an electronic periscope view simulator such as is taught in U.S. Pat. Nos. 3,479,454 dated Nov. 19, 1969, and 3,420,953 dated Jan. 7, 1969, to Hanns H. Wolff, a plurality of television cameras respectively survey a marine environment such as a seascape and one or more models of objects such as ships, planes, etc., which a submarine might encounter at sea. An electronic synthesizer system combines the video outputs of the several cameras into a composite signal representing the models against the seascape, which is displayed on a television monitor screen. Computer-controlled circuits can cause the models to maneuver in the scene, that is to move across the seascape, to move towards or away from an observer, and to disappear beyond the horizon. The effect of moving away, that is, increasing the range between a model ship and an observer, is created by causing the size of the target image to progressively diminish and to simultaneously move upward on the screen until it is silhouetted on the horizon, then if the range is further increased, to gradually sink below the horizon. Ship maneuvers may follow a prearranged program which can be overridden by instructors operating manual controls. Some or all of the model images can be continuously controlled manually. The television monitor is incorporated into a mockup of the periscope operator's station in a submarine. A trainee at the operator's station looks through the eyepiece of a replica of an operational periscope and sees the scene projected on he TV monitor. By manipulating the various periscope controls the trainee can scan the seascape, observe, track, and aim at the various model ships, and in general practice the manipulative skills required to operate a periscope effectively.

Applicant's invention is designed to be incorporated in an electronic periscope view simulator to enable a trainee to practice stadimeter operation to determine the range of ships and other objects. It is essential that submarine personnel be able to accurately determine the range of both enemy and friendly ships in order to operate effectively.

The invention, as shown in FIG. 2, provides a range knob 3 which is incorporated into the other controls mounted on the periscope tube (not shown) in a periscope view simulator. Range knob 3 is operatively connected to a range dial 8 so that adjustment of 3 adjusts 8. When the trainee observing a ship on the monitor screen through the periscope eyepiece adjusts range knob 3 to position the ghost image of a ship atop the real image in the manner explained in the description of FIG. 1, the range dial 8 will be positioned so that if the approximate height of the ship is known, the range can be read on dial 8.

The invention operates by selectively delaying the video signal in one of two parallel channels between an electronic synthesizer 111 and a television monitor 9 to create a movable ghost image on the monitor screen. A first "real image" channel between synthesizer 111 and monitor 9 is comprised of a fixed video delay 13, a video adder 14, and connecting lines 101, 107, and 108. A second "ghost image" channel is comprised of a blanking pulse clipper 15, a variable video delay 16, an adjustable attenuator 17, a video gate 18, video adder 14, and connecting lines 102, 103, 104, 105, 106, and 108. Range knob 3 is operatively connected to the wiper of a potentiometer $R_1$ which is supplied with a voltage $V_1$. Adjustment of knob 3 moves the wiper to adjust $R_1$ so that a control voltage of a magnitude proportional to the range is supplied over a line 109 to variable video delay circuit 16 to delay the ghost image video signal. Electronic synthesizer 111 includes video combining means 112. These are complex circuits which include the plurality of TV cameras and means for combining the video outputs of the cameras into a composite video signal which is furnished to a television monitor 9. The structure and function of these elements are described in the aforementioned patents to Hanns H. Wolff. Television monitor 9 projects the scene observed by the several cameras of electronic synthesizer 111, including the seascape and ships which a trainee observes through the periscope of a periscope view simulator.

The composite video signal from video combing means 112 is furnished to monitor 9 over the real image channel. The output signal from video adder 14 is the video information which is projected by monitor 9. The composite video signal from video combining means 112 is also furnished to monitor 9 over the ghost image channel. Blanking pulse clipper 15 in the ghost image path removes the blanking pulses, and forwards the clipped signal over line 103 to variable video delay 16. The output of 16 is furnished over line 107 to an adjustable attenuator 17, which controls the intensity of the ghost image on the screen of the monitor. The output of 17 is furnished over line 105 to gate 18, and if not blocked by gate 18, over line 106 to video adder 14, where it is added to the unclipped video signal received from fixed video delay 13. Video gate 18 is controlled to block or pass the signal from attenuator 17 in accordance with a control voltage on line 110 from a switch $S_1$ which is operatively connected to be controlled by an in/out knob 11 mounted near range knob 3 on the periscope tube (not shown) in the periscope view simulator.

The invention achieves the stadimeter effect in the scene observed through the periscope on monitor 9 by superimposing the image derived from the variably delayed signal on line 106 on the image derived from the video on line 107. The effect of the invention can be understood by visualizing monitor 9 in operation projecting a composite scene derived from the video signal from fixed delay 13 alone. Video gate 18 is "off" blocking the video signal from adjustable attenuator 17. Fixed delay 13 would have no noticeable effect on the picture shown on monitor 9. When a trainee positions himself at the eyepiece of the periscope and moves in/out knob 11 to the "in" position to simulate stadimeter operation, movement of knob 11 moves switch $S_1$ from its grounded contact to its upper contact thereby supplying positive enabling voltage $V_2$ to video gate 18. The video signal from adjustable attenuator 17 is then gated through 18 and furnished to video adder 14 over line 106. The video signal on line 106 is added in adder 14 to the video signal on line 107 to create a ghost image similar to that illustrated in FIG. 1 in the picture on monitor 9. The trainee adjusts the position of the ghost image vertically with respect to the real image on monitor 9 by adjusting the range knob 3 to vary the setting of potentiometer $R_1$, thereby varying the delay of variable video delay 16. This procedure simulates the adjustment of a ghost image illustrated in FIG. 1 accurately and realistically. The cameras and the monitor are swept from top to bottom so that the television rasters comprise vertical scan lines, therefore adjustment of delay 16 causes vertical movement of the ghost image.

Fixed video delay 13 is selected to have a delay equal to the minimum delay of variable video delay 16. When delay 16 is adjusted for minimum delay the real image and ghost image are superimposed.

The blanking pulses must be clipped from the composite video signal since a delay in the video signal will shift the blanking pulses into the display time. The blanking pulses would appear as a black line when displayed on the monitor. Blanking pulse clipper 5 removes the blanking pulses from the composite video signal, thereby maintaining a constant video level during the blanking time.

What is claimed is:

1. In a periscope view simulator training device having means for combining video information from a plurality of cameras into a composite picture on at least one television monitor display, the improvement comprising:

a real image channel between said combining means and said monitor for passing combined video information from said combining means to said monitor, a ghost image channel between said combining means and said monitor for passing combined video information from said combining means to said monitor, said real image channel and said ghost image channel being arranged in a parallel configuration, means to superimpose a ghost image picture derived from the video information passed by said ghost image channel on a real image picture derived from the video information passed by said real image channel on said television monitor, and means for moving said ghost image picture with respect to said real image picture.

2. The apparatus of claim 1, said means for moving said ghost image picture with respect to said real image picture comprising adjustable means for moving said ghost image picture vertically on said television monitor.

3. The apparatus of claim 2, wherein said adjustable means for moving said ghost image picture vertically include variable video delay means for delaying the video information passed by said ghost image channel with respect to the video information passed by said real image channel.

4. The apparatus of claim 3, and including clipper means in said ghost image channel for clipping blanking pulses from said video information to avoid blanking pulse interference in the picture on said television monitor.

5. The apparatus of claim 4, and including adjustable attenuator means in said ghost image channel for selectively adjusting the intensity of said ghost image picture with respect to said real image picture.

6. The apparatus of claim 5, and including a periscope having an eyepiece, said television monitor being observable through said eyepiece, ghost image switch means located adjacent said eyepiece for activating said ghost image channel, a range control means located adjacent said eyepiece for adjusting the apparent range of an object in the picture on said television monitor, and range indicating means responsive to operation of said range control means.

7. The apparatus of claim 6, and including a video gate in said ghost image channel, said ghost image switch means being arranged to selectively activate said video gate to pass said video information in said ghost image channel, said range control knob being arranged to adjust said variable video delay to selectively delay said video information in said ghost image channel.

8. The apparatus of claim 7, said real image channel comprising a fixed video delay and a video adder, said ghost image channel comprising said clipper means, said variable video delay, said adjustable attenuator, said video gate, and said video adder, said video adder being arranged to add the video information passed by said ghost image channel to the video information passed by said real image channel.